United States Patent [19]
Miyata et al.

[11] Patent Number: 4,785,727
[45] Date of Patent: Nov. 22, 1988

[54] ROTARY PICKLES MAKING DEVICE

[75] Inventors: Makoto Miyata, Yawata; Yoshihiko Shigeno, Neyagawa; Yoshiyuki Ishida, Kawanishi, all of Japan

[73] Assignee: Matsushita Electric Works, Ltd., Osaka, Japan

[21] Appl. No.: 113,738

[22] Filed: Oct. 28, 1987

[30] Foreign Application Priority Data

Nov. 15, 1986 [JP] Japan ............................ 61-272430
Nov. 15, 1986 [JP] Japan ............................ 61-272432
Feb. 6, 1987 [JP] Japan ............................ 62-26695

[51] Int. Cl.⁴ .................. A23B 7/10; A23L 1/218
[52] U.S. Cl. ............................... 99/535; 366/233
[58] Field of Search .............. 99/516, 534–536, 99/467, 468, 353; 366/233, 234, 101, 105

[56] References Cited

U.S. PATENT DOCUMENTS

| | | | |
|---|---|---|---|
| 3,350,068 | 10/1967 | Vincedon | 366/233 X |
| 3,438,353 | 4/1969 | Pellegrini | 366/233 X |
| 4,214,518 | 7/1980 | Petsche | 99/535 |
| 4,350,430 | 9/1982 | Johnson | 366/233 X |
| 4,669,274 | 6/1987 | Huang | 366/233 X |

FOREIGN PATENT DOCUMENTS

| | | |
|---|---|---|
| 54-95783 | 7/1979 | Japan . |
| 61-167781 | 10/1986 | Japan . |
| 62-4986 | 1/1987 | Japan . |
| 1424078 | 7/1973 | United Kingdom ........... 99/535 |

*Primary Examiner*—Timothy F. Simone
*Attorney, Agent, or Firm*—Burns, Doane, Swecker & Mathis

[57] ABSTRACT

A rotary pickles making device comprises a base body including spaced drive and guide rollers rotatably mounted in the body, and a pickling casing for containing pickling rice-bran paste with foodstuffs. The casing is placed on the drive and guide rollers to be rotated thereby. The drive roller is rotated by a driving source disposed in the interior of the drive roller. The guide roller contacts the casing at a higher elevation than does the drive roller to transfer extra loading to the drive roller in order to enhance the frictional drive forces between the drive roller and the casing.

13 Claims, 8 Drawing Sheets

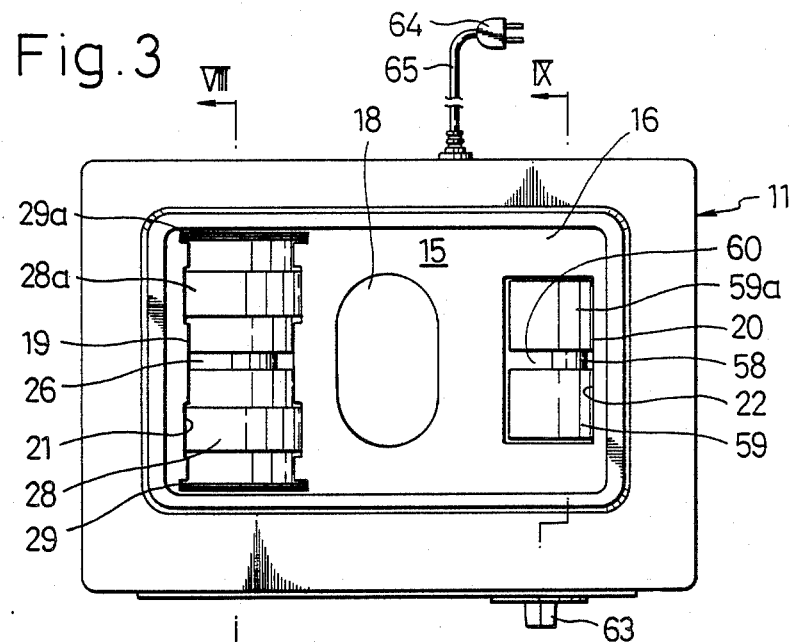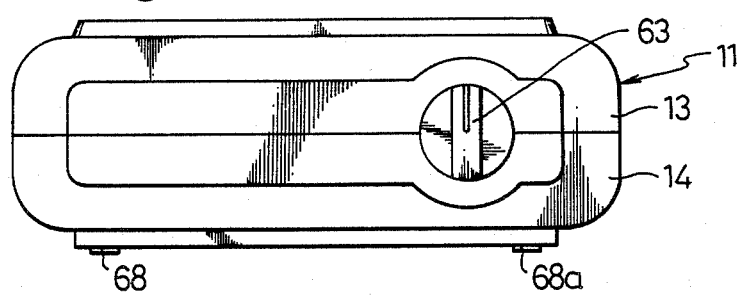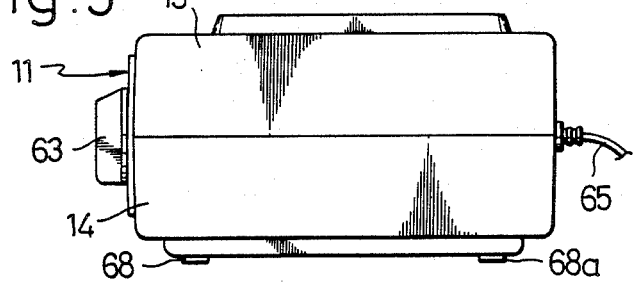

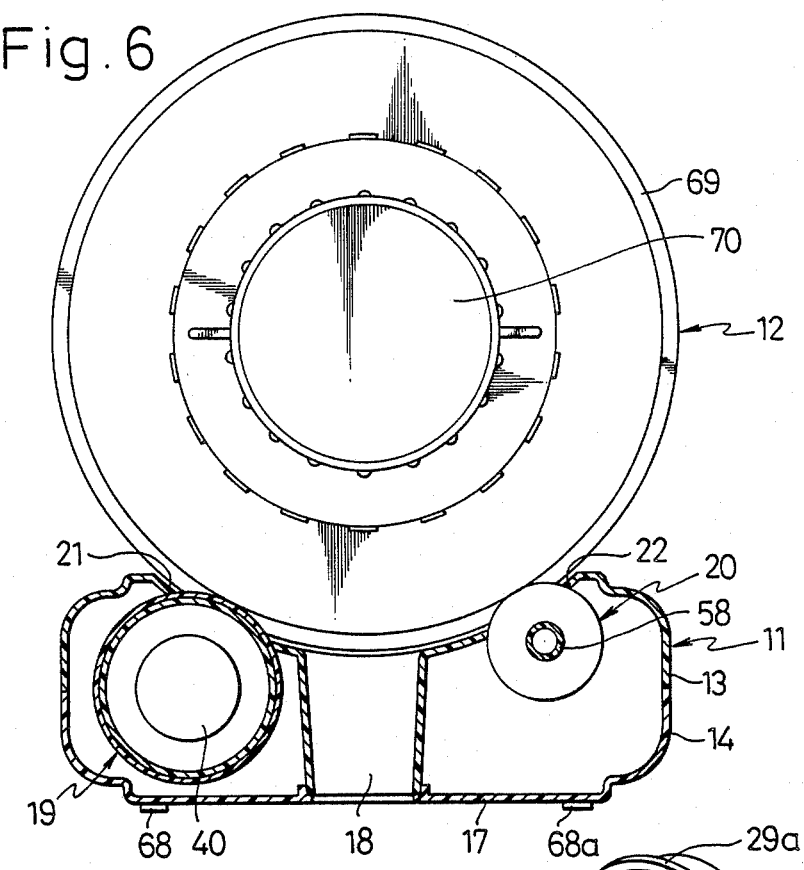
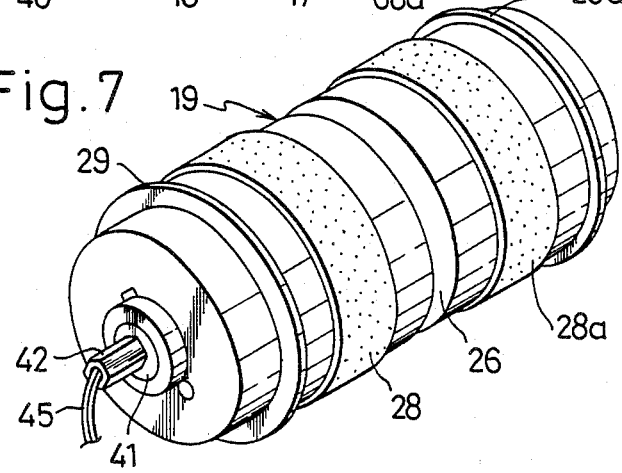

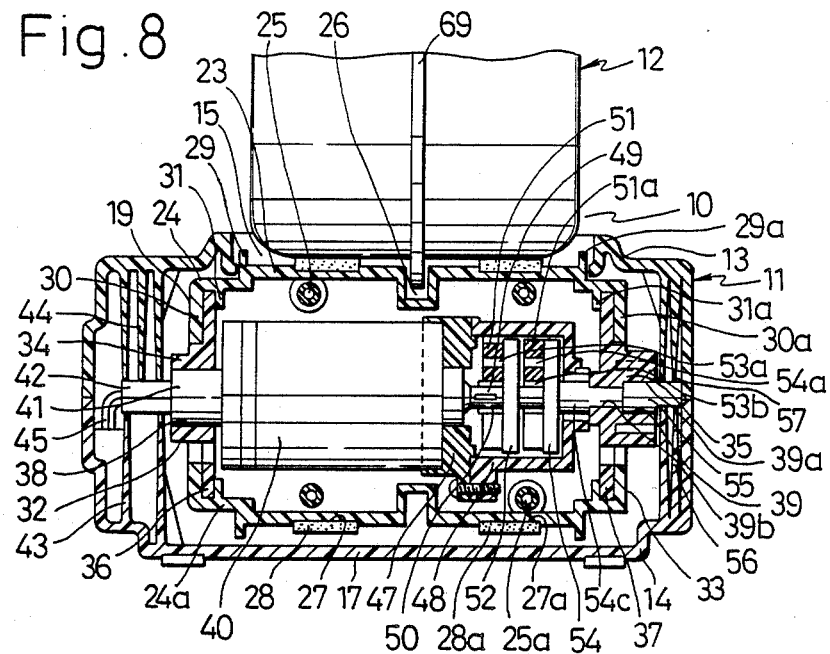
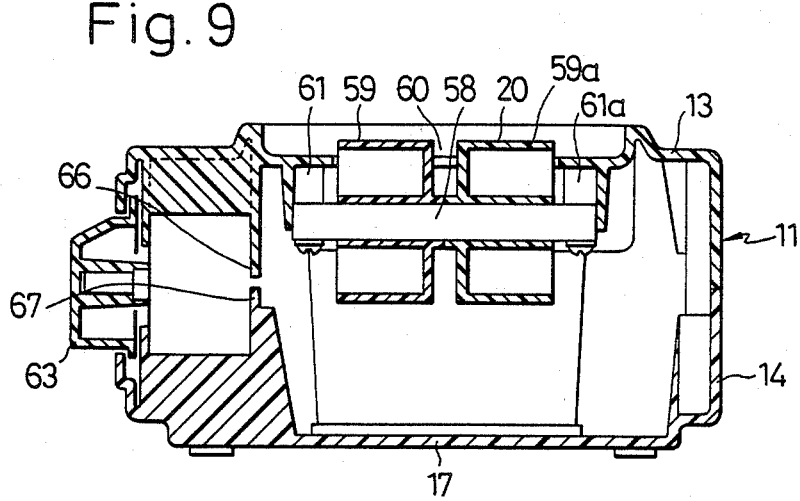

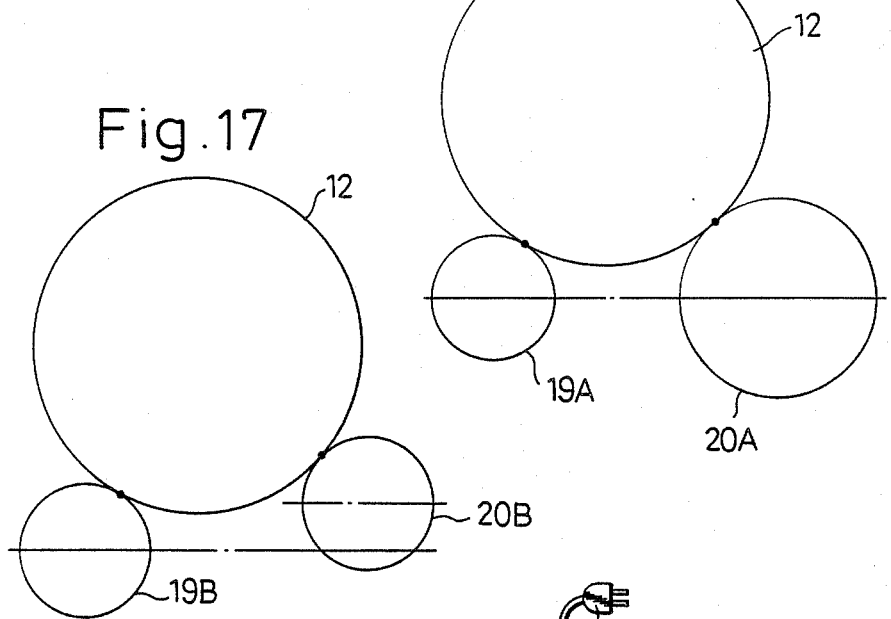

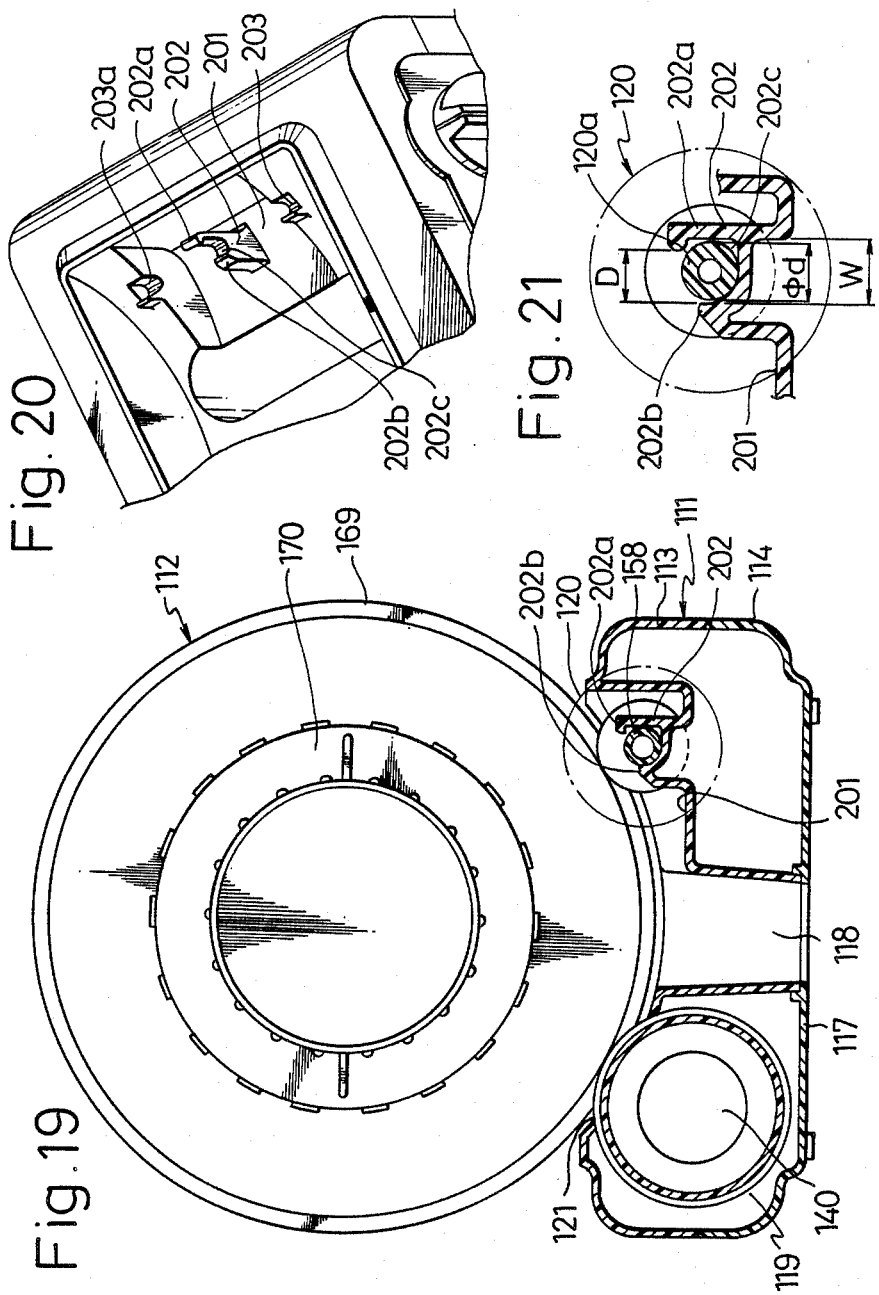

4,785,727

ROTARY PICKLES MAKING DEVICE

TECHNICAL BACKGROUND OF THE INVENTION

The invention relates generally to devices for making pickles and, more particularly, to a rotary pickles making device in which a pickling casing is rotated to agitate a pickling rice-bran paste containing foodstuffs to be pickled.

A pickles making device as described above is useful as it allows a pickling paste to be formed in the pickling casing with rice bran fermented therein with a proper amount of salt and water admixed, and such foodstuffs as vegetables pickled to be embedded in the paste and affected by a fermentation of the paste to be seasoned to a traditional Japanese pickles flavor and taste.

DISCLOSURE OF PRIOR ART

It is considered that the rice bran ferments mainly with lactic fermentation accompanied by yeast fermentation, so as to be able to have the foodstuffs seasoned to be peculiarly tasty, but the rice bran paste in the fermentation is in the process of metabolism in which the state is always variable and unstable. During the process, it is necessary to sufficiently agitate the rice bran paste to supply air within the paste so that in particular lactobacillus showing slight aerobic property can be preserved while restraining the unnecessary propagation of, for example, butylic acid bacteria that shows anaerobic property and adversely affects the paste. When the air supply is not sufficient, the propagation of butylic acid bacteria and the like becomes excessive in the paste so as to render the paste to be odorous and diminish the flavor of pickles.

There has been suggested a pickler of the kind referred to in Japanese Utility Model Application Laid-Open Publication No. 61-167781 by Yoshio Kishinami, in which a cylindrical pickling casing is disposed with its axis tilted relative to vertical. A rice bran paste for the pickling is formed within the casing to allow foodstuffs to become embedded therein, and the casing is rotated about its axis by means of a motor driven drive roller brought into contact with the bottom of the casing. In this pickler, the pickling casing is only rotated about the casing's tilted axis so that such rotation by itself could produce a sufficient displacement of the pickling rice-bran paste inside the pickling casing to supply sufficient air to the paste. Accordingly, in this pickler, a basket for the foodstuffs to be pickled is disposed displaceably within the casing in off-centered relation to the tilted axis of the casing so that the paste will be sufficiently agitated by this basket.

With this arrangement of the known pickler, however, there have arisen many drawbacks due to the displaceable disposition of the basket for the pickling foodstuffs within the pickling casing for agitation of the pickling paste. For example, the overall volume of the device is required to be large while a utilizable space for containing the foodstuffs is restricted to be considerably small, and the arrangement has not been suitable as a small pickler particularly for general home use.

Another pickler has been suggested in Japanese Patent Appln. Laid-Open Publication No. 5495783 by Shichiro Asahi, wherein a pickling casing is improved in the displacing ability with respect to contents, without such displaceable basket as in the above. In this known pickler, a substantially short cylindrical shaped pickling casing is mounted across two motor-driven rollers to be rotated about a horizontal axis. This pickler is designed for producing pickles within a short period by means of increased contact of pickling foodstuffs with a seasoning sause placed in the rotated pickling casing. The arrangement in which a drive motor is mounted below two rollers and is to be coupled to these rollers through an endless chain or belt, does not lend itself to a miniaturization of the entire device.

A primary object of the present invention is therefore to provide a rotary pickles making device in which the utilizable space for the foodstuffs to be pickled can be sufficiently enlarged with respect to the entire volume, for effective miniaturization of the device. Thus, the device can be employable as a home use pickler while allowing the pickling rice-bran paste to be sufficiently displaceable and agitated for achieving an excellent air supply.

SUMMARY OF THE INVENTION

According to the present invention, this object can be realized by providing a rotary pickles making device which comprises a base body having a recess opened wardly, a drive roller rotatably mounted in the base body and exposed at least partly in the recess, a guide roller rotatably mounted in the base body and exposed at least partly in the recess and opposed to the drive roller with a space therebetween, a motor disposed within the drive roller for rotation thereof, and a pickling casing placed on the drive and guide rollers, the pickling casing allowing a pickling rice-bran paste to be formed therein for receiving foodstuffs to be pickled in the paste. The guide roller contacts the casing at a location higher than the drive roller to increase the amount of load carried by the latter, thereby enhancing the driving friction.

In the rotary pickles making device of the present invention as set forth in the above, the disposition in particular of the motor for providing to the drive roller a rotational driving force to be inside the drive roller is effective to miniaturize the base body which supporting rotatably the drive and guide rollers, enabling the pickling casing to be enlarged. Further, the pickling casing is rotated about the axis of its drum-shape disposed horizontal, whereby the pickling paste within the pickling casing can be agitated with a sufficient displacement giving during such rotation. Thus, the propagation of any anaerobic butylic acid bacteria can be well restrained by supplied air into the paste during its agitation, and the foodstuffs can be pickled to have an excellent flavor constantly.

Further objects and advantages of the present invention shall be made clear in following explanation of the invention detailed with reference to its embodiments shown in accompanying drawings:

BRIEF EXPLANATION OF THE DRAWINGS

FIG. 3 is a plan view of the base body of the device of FIG. 1;

FIG. 4 is a front view of the base body of the device of FIG. 1;

FIG. 5 is a side view of the base body of the device of FIG. 1;

FIG. 6 shows in a front view the pickles making device of FIG. 1, with the base body vertically sectioned;

FIG. 7 shows in a perspective view of the drive roller incorporating therein the motor, in the device of FIG. 1;

FIG. 8 is a vertically sectioned view along line VIII—VIII in FIG. 3 of the device shown in FIG. 1, with the pickling casing partly shown;

FIG. 9 is a sectioned view of the base body taken along line IX—IX in FIG. 3 of the device of FIG. 1;

FIGS. 16 and 17 are schematic views of the rotary pickles making device of other embodiments of the present invention;

FIG. 18 shows in a plan view a base body of another embodiment of the rotary pickles making device according to the present invention;

FIG. 19 shows in a front view similar to FIG. 16 the device of FIG. 18;

FIG. 20 is a fragmentary perspective view of the device of FIG. 18 on its side at which the guide roller is supported; and FIG. 21 is a fragmentary sectioned view of the guide roller support means in the device of FIG. 18.

Figure 1:
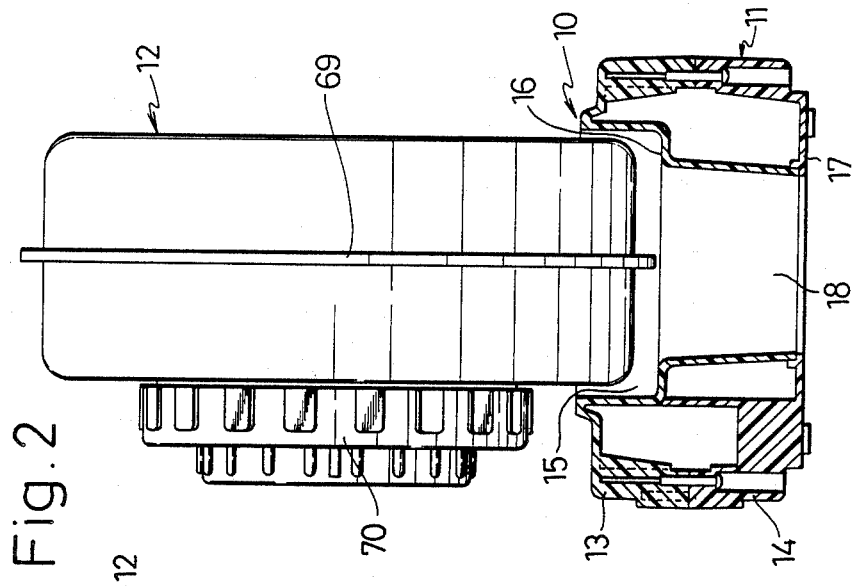
FIG. 1 shows in a perspective exploded view embodiment of the rotary pickles making device of the present invention.
Figure 2:
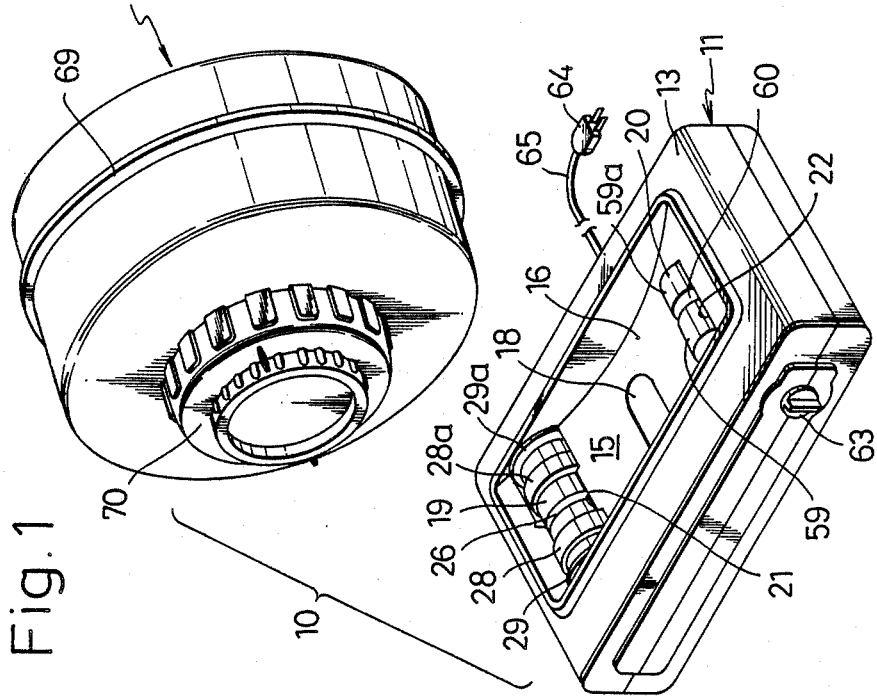
FIG. 2 is a side view of the device of FIG. 1 with the base body vertically sectioned.

While the present invention shall now be explained with reference to the embodiments shown, it is not intended to limit the invention only to such embodiments but is rather intended to cover all of modifications, alterations and equivalent arrangements possible with the scope of appended claims.

DISCLOSURE OF PREFERRED EMBODIMENTS

Referring to FIGS. 1 through 10, there is shown a rotary pickles making device 10 according to the present invention, which comprises a generally flat and rectangular base body 11, and a hollow drum-shaped pickling casing 12 of a short cylindrical shape closed at both axial ends. The base body 11 is formed with upper and lower housing halves 13 and 14 which are complementarily fitted to each other, while the upper housing half 13 is formed to define in the upper side face a relatively large recess 15 opened upward. The recess 15 has a bottom wall 16 which is curved arcuately in the longitudinal direction of the rectangular body 11, for receiving a peripheral part of the pickling casing 12. The bottom wall 16 has substantially in the center a drain port 18 defined by side walls depending from the bottom wall 16 to reach a bottom wall 17 of the lower housing half 14 where the latter is also opened correspondingly, for discharging any fluid from the upper side to the lower side of the base body 11.

In the base body 11, a drive roller 19 and a guide roller 20 are rotatably supported to lie in a widthwise direction and substantially in parallel relation to each other as spaced in the longitudinal direction of the body 11, while being partly exposed in the recess 15 through apertures 21 and 22 made in the bottom wall 16. In the present instance, the drive roller 19 is provided to have a diameter relatively larger than the guide roller 20, while the latter is disposed such that its point of contact with the casing 12 is disposed at a higher level than the contacting point between the drive roller 19 and the casing 12. In this recess 15, the pickling casing 12 is received such that a peripheral surface thereof travels on the spaced drive and guide rollers 19 and 20, so that the drum-shaped pickling casing 12 will be axially rotated due to contact with the drive roller 19.

Referring in particular to FIGS. 7 and 8, the drive roller 19 comprises a roller casing 23 of a hollow enclosed cylindrical shape formed with halves 24 and 24a complementarily fitted together and fastened to each other by screws 25 and 25a. In the longitudinal center of the roller casing 23, a circumferential guide groove 26 is made, and on both sides of this central guide groove 26 a pair of circumferential recesses 27 and 27a are provided for mounting therein a pair of friction rings 28 and 28a preferably of a higly anti-slip frictional rubber. On both outer sides in the axial direction of the circumferential recesses 27 and 27a, there are provided water-retaining annular fins 29 and 29a projected radially outward, and the roller casing 23 is made slightly smaller in the diameter at both axial end parts outside the fins 29 and 29a than at the intermediate body part disposed between the fins.

Further, the roller casing 23 is provided with two axial end walls 30 and 30a having axial holes. On an inner periphery of the casing 23 closely adjacent the end walls 30 and 30a, are disposed annular inward projections 31 and 31a. Immediately inside the axial end walls 30 and 30a, first and second bearing members 32 and 33 respectively having a boss 34 or 35 and a radial flange 36 or 37 are fitted. The bosses 34 and 35 are engaged in the axial holes of the end walls 30 and 30a with radial projections of the bosses engaged in receiving notches in the end walls 30 and 30a for preventing rotation of the bearing members 32 and 33 with respect to the roller casing 23. The radial flanges 36 and 37 are inserted in annular spaces defined between the end walls 30 and 30a and the annular projections 31 and 31a. An axial hole 38 is made in the boss 34 of the first bearing member 32, while the boss 35 of the second bearing member 33 is formed in a shape of double cylinders in the center of which an axial hole 39 is provided. The axial hole 39 includes an axially outer, larger-diametered hole part 39a and an axially inner, smaller-diametered hole part 39b. The larger hole part 39a is made circular in section, whereas the smaller hole part 39b is made partly circular and partly flat in section to prevent relative rotation of a shaft 54c disposed therein.

Figure 10:
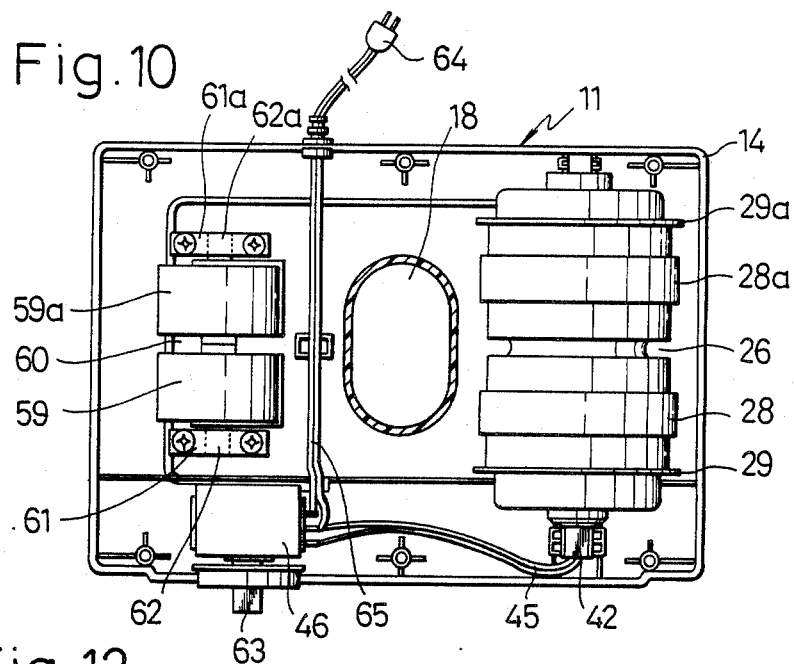
FIG. 10 is an inner bottom view of the base body of the device of FIG. 1.
Figure 12:
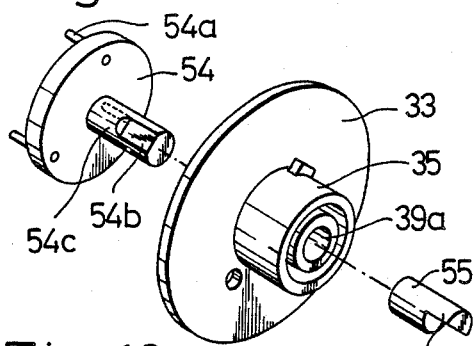
FIG. 12 shows in a perspective view the other motor support means with associated bearing members.
Figure 11:
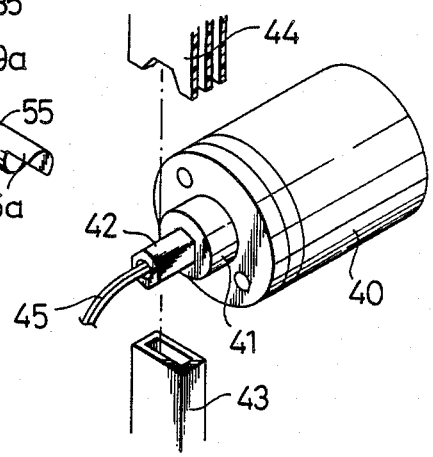
FIG. 11 shows in a perspective view a motor support means as disassembled.

A motor 40 is mounted inside the roller casing 23 of the drive roller 19, so that an axial end boss 41 of the motor 40 is passed through the axial hole 38 of the first bearing member 32 allowing the member 32 to be rotatable relatively about the boss 41. An axially outward projection 42 of the boss 41 formed of a polygonal shape such as hexagonal is held between an upstanding supporting part 43 in the lower housing half 14 and an opposing holder part 44 suspended down from the upper housing half 13 (see also FIG. 11). A power supply wire 45 to the motor 40 is passed axially through the boss 41 and projection 42 and is connected at an outer end to a timer 46 mounted inside the base body 11 (FIG. 10). To the other end side of the motor 40, a mounting flange 47 of an outer gear piece 48 is secured, while an output shaft 49 of the motor 40 is engaged into the center of the gear piece 48. Between inner gear teeth of the gear piece 48 and a pinion 50 mounted onto the output shaft 49, internal gears 51 and 51a forming a known planetary gear system are disposed. Between these internal gears 51 and 51a, there is provided an intermediate transmission disk 52 having on one side an interlock pin 53a interlocking with the internal gear 51 and on the other side a center pin 53b interlocking with the other internal gear 51a. The arrangement is such that when the internal gear 51 is rotated in response to a rotation of the pinion 50 of the motor 40, the other internal gear 51a will be rotated through the intermediate transmission disk 52 in planetary relationship and the output rotating speed of the motor 40 can be properly reduce depending on the gear ratio.

In the planetary gear system, an output transmission disk 54 interlocks therewith through interlocking pins 54a on one side of the disk, while an output shaft 54c having on its periphery a flattened face 54b projects axially out of the other side of the output transmission disk 54. This output shaft 54c is engaged in non-rotating relationship with the axially inner side hole 39b of the second bearing member 33. With this arrangement, the output of the motor 40 is transmitted through the planetary gear system to the other end wall 30a of the roller casing 23 whereby, the roller casing 23 is rotated. Into the axially outer hole 39a of the second bearing member 33, a pivoting shaft 55 is engaged so that the second bearing member 33 will be rotatable about this shaft 55. The shaft 55 includes a fixing part 55a flattened to be semicircular in section at an end of the shaft 55 and held between a support base 56 erected upward on the lower housing half 14 and an opposing holder part 57 suspended downward from the upper housing half 13 of the base body 11.

Figure 13:
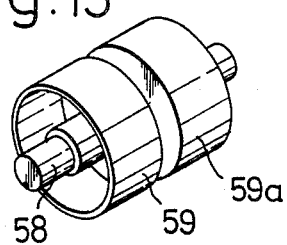
FIG. 13 is a perspective view of the guide roller in the device of FIG. 1.

Referring in particular to FIGS. 9 and 10 in conjunction with FIG. 13, the guide roller 20 comprises a main shaft 58, and a pair of roller pieces 59 and 59a symmetrically fitted and fixed onto the shaft 58. A central guide groove 60 is defined between the roller pieces 59 and 59a, the groove 60 being similar to the guide groove 26 in the drive roller 19. The shaft 58 is axially rotatably supported between supporting parts 61 and 61a formed on the inner wall of the upper housing half 13 and semiarcuate holders 62 and 62a secured by screws to the housing half 13.

The timer 46 is provided with a knob 63 accessible at the front face of the base body 11 for setting the operation time and also for turning ON and OFF the power. Another power supply wire having at an externally extended end a plug 64 for connection with a commercial A.C. power source is connected to the timer 64. On the back of the timer 64, partitions 66 and 67 projecting downward and upward from the upper and lower housing halves 13 and 14, respectively, are disposed for preventing any water from leaking into electrical connection part including the timer 46 even when both rollers 19 and 20 are wetted. On the outer bottom face of the lower housing half 14 of the base body 11, slip-proof members 68 and 68a preferably formed of a rubber are provided to prevent the body from slipping on a table or the like place.

The short drum-shaped pickling casing 12 is made preferably by blow molding to provide a radially outwardly projecting, a guide rib 69 engageable in the guide grooves 26 and 60 of the drive and guide rollers 19 and 20 when the casing is placed thereon. On one axial side of the pickling casing 12, an opening smaller than the diameter of the casing is provided, and a detachable cap 70 is mounted to the opening for easy introduction of the rice-bran paste and foodstuffs to be pickled as well as easy ejection of the pickled stuffs.

In the foregoing arrangement, substantially all of the componential parts of the device, except for such electric members as the motor 40, timer 46 and so on, can be formed of a plastic material, so that the device can be corrosionproof, light-weight and easy to be cleaned.

The operation of the rotary pickles making device according to the present invention as has been disclosed shall be explained next. The cap 70 of the pickling casing 12 is initially detached, and a batch of rice bran, a proper amount of salt and a proper amount of water are introduced into the casing 12, filling about one half space of the casing, and they are agitated and mixed to form a pickling rice-bran paste. Any desired foofstuffs to be pickled such as various raw vegetables will then be introduced into the paste within the casing 12, and the cap 70 is tightly fitted to the casing 12. In this state, the pickling casing 12 is placed upon the drive and guide rollers 19 and 20 while being prevented from tilting or falling by means of the side walls of the recess 15. The guide rib 69 of the casing 12 is engaged in the guide grooves 26 and 60 of the both rollers 19 and 20.

The knob 63 is operated to turn the device ON and also to set a time for which the motor 40 is to be driven, for example, 2 hours. The output rotation of the motor 40 is transmitted through the speed-reduction planetary gear system to the roller casing 23 of the drive roller 19, causing the roller casing 23 to be rotated.

Figure 14A:
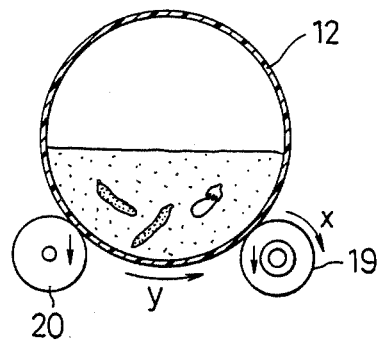
FIGS. 14(a) through 14(c) schematic views of the casing interior depicting the operation of the pickles making device of FIG. 1.
Figure 14B:
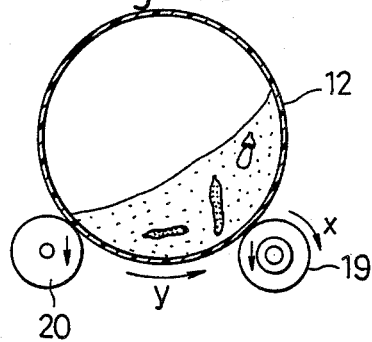
Figure 14C:
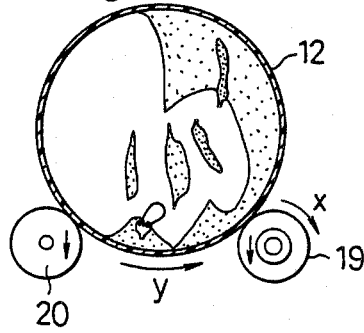

Upon this rotation of the drive roller 19, its rotation is transmitted through the slip-preventing frictional rings 28 and 28a to the pickling casing 12, so that the casing 12 can be rotated at a predetermined rate. As seen in FIGS. 14(a) to 14(c), in this case according to the present invention, the rotating direction of the pickling casing is opposite to that of the drive roller 19, that is, the drive roller 19 rotated in x direction causes the pickling casing 12 to be rotated in y direction. Thus the lowermost peripheral part of the pickling casing 12 travels from the guide roller 20 to the drive roller 19. By so setting the rotating direction of the pickling casing 12, (the direction y in FIGS. 14), it is made possble to provide to the device a tendency in which the load applied onto the guide roller 20 is smaller than that on the drive roller 19. When the casing 12 is thus rotated to have its lowermost part traveling always toward the drive roller 19, as will be readily appreciated, the pickling rice-bran paste and foodstuffs to be pickled are caused to follow this rotation of the casing as carried by the inner surface of the casing due to the viscosity of the paste, so that the paste and foodstuffs will shift one-sidedly on the side of the drive roller 19 as shown in FIG. 14(b), and a larger load is applied onto the drive roller 19. As the pickling casing 12 is further rotated, the paste and foodstuffs further shifted up are caused to fall down due to gravity substantially to the lowermost part of the casing, so that there occurs no weight shift in the casing to the guide roller 20, and the load can be kept to be constantly on the drive roller 19. With this arrangement, the pickling casing 12 can be constantly brought into contact with the drive roller 19 under the relatively larger load of the contents, so as to be constantly smoothly rotated without any slipping caused therebetween. When the contents fall down in the state of FIG. 14(c), the contents are subjected to an agitation to be supplied with suffient air, and the propagation of anaerobic butylic acid bacteria and the like can be effectively restrained.

Figure 15A:
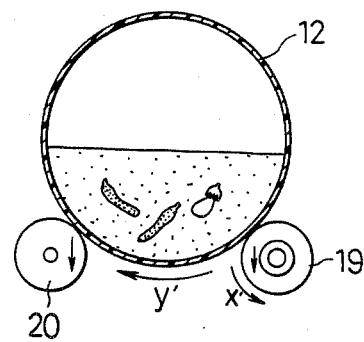
FIGS. 15(a) through 15(c) are schematic views of a theoretical pickling operation, for comparison with the invention depicted FIGS. 14(a)–14(c)
Figure 15B:
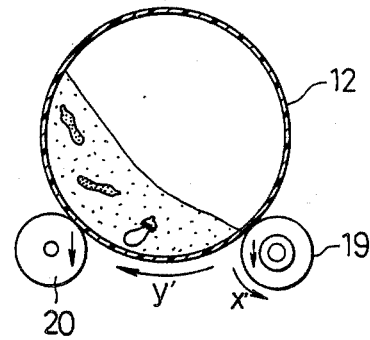
Figure 15C:
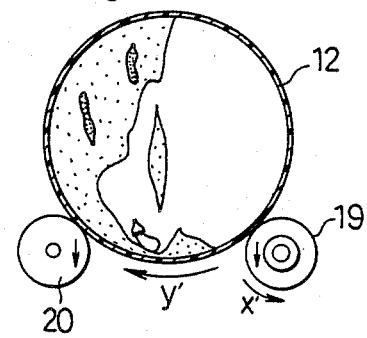

It should be appreciated that, if the drive roller 19 were, instead, to be rotated oppositely in direction x' as shown in FIGS. 15(a) to 15(c) to rotate the pickling casing 12 in direction y', the load of the contents becomes larger on the side of the guide roller 20 (in opposite manner to the above operation), whereby the contact of the pickling casing 12 with the drive roller 19 is lowered to likely cause a slipping between the rollers 19 and 20, and smooth rotation of the pickling casing could not be assured.

Additionally, the contacting point of the guide roller 20 with the picklying casing 12 is positioned to be higher with respect to the horizontal line than the contacting point of the drive roller 19 with the casing 12, as has been earlier referred to, so that the load deviation onto the side of the drive roller 19 can be also promoted due to the level difference.

In the present invention, various design modifications can be made. For example, in the planetary gear system, the same has been referred to as comprising the intermediate transmission disk 52 and a pair of the internal gears 51 and 51a interlocking with the disk 52, the number of these members can be properly increased. While the drive roller 19 has been referred to as being relatively larger than the guide roller 20, it may be possible, as shown in FIG. 16, to provide a drive roller 19A to be of a smaller diameter and the guide roller 20A be of a larger diameter so long as the contacting point of the guide roller 20A with the pickling casing is positioned at a higher level than the contacting point of the drive roller 19A with the casing 12, or even to provide the both rollers 19B and 20B to be substantially of the same diameter, as shown in FIG. 17 wherein the guide axis is disposed higher than the drive roller axis.

Further, the guide roller may be removable through the recess 15 of the base body 11, so that guide rollers having roller pieces of different diameters will be employable in an event where, for example, two or more pickling casings of different diameters are utilized. Referring thereto more in details with reference to FIGS. 18 to 21, a small recess 201 with a flat bottom face is formed instead of the roller exposing aperture 22 in the recess of the foregoing embodiment. A support rib 202 is erected in the center of the small recess 201. This rib 202 is formed to have at the top part a larger upward projection 202a on rear side with respect to the center of the base body 111 and a smaller projection 202b bulging on the front side. A shaft-receiving notch 202c slightly constricted at the entrance is defined between these projections 202a and 202b, for receiving central shaft part 120a of the guide roller 120. In this case, as seen in FIG. 21, the width D at the constricted entrance of the notch 202c is made smaller than the diameter $\phi d$ of the shaft 120a of the guide roller 120 whereas the width W of the notch 202c is larger than the shaft diameter $\phi d$, so that the guide roller 120 to which the load of the pickling casing 112 is applied in a vertically downward direction will not be disengage from the shaft-receiving notch 202c, while the shaft can be maintained smoothly rotatable within the notch 202c. On both lateral sides of the small recess 201, further, a pair of recesses 203 and 203a are provided for receiving both end parts of the guide roller shaft 120a so as to be aligned with the shaft-receiving notch 202c of the rib 202. Accordingly, there can be employed guide rollers respectively having a pair of roller pieces 159 and 159a adapted to the size of the pickling casing 112 or, if required, different in the axial length, mutual spaced distance and so on. In FIGS. 18 to 21, members identical to those in the embodiment of FIGS. 1 to 13 are denoted by the same reference numerals but added by 100 and, except for the supporting arrangement for the guide roller 120, other arrangement and operation of the present embodiment are substantially the same as those in the embodiment of FIGS. 1 to 13.

What we claim as our invention is:

1. A rotary pickles making device comprising:
   a base body,
   a drive roller rotatably mounted in said base body and at least partially exposed therefrom,
   a motor for rotating the drive roller,
   a guide roller rotatably mounted in said base body and at least partially exposed therefrom, said guide and drive rollers being rotatable about parallel axes, said guide roller spaced from said drive roller in a direction laterally of said axis of
   said drive roller, an uppermost portion of an outer peripheral surface of said guide roller disposed higher than an uppermost portion of an outer peripheral surface of said drive roller, and
   a drum-shaped pickling casing having an outer periphery resting on said drive and guide rollers so as to be rotatable about an axis disposed parallel to said axes of said rollers in response to frictional contact between said pickling casing and said drive roller, whereby a pickling paste and foodstuffs to be pickled are agitated in said pickling casing,
   the place of contact between said pickling casing and guide roller being disposed at a higher location than the place of contact between said pickling casing and drive roller such that the loading of said drive roller is greater than the loading of said guide roller to increase the frictional driving forces applied to said pickling casing by said drive roller.

2. A device according to claim 1, wherein said base body includes an upwardly open recess within which said drive and guide rollers are exposed, a lower portion of said pickling casing outer periphery disposed in said recess.

3. A device according of claim 1, wherein said drive roller comprises a casing, said motor being contained within said roller casing, and speed-reducing motion transmitting means disposed in said roller casing for transmitting rotary motion from an output of said motor to said roller casing.

4. A device according to claim 1, wherein said outer peripheral surface of at least one of said drive and guide rollers contains a circumferential guide groove, said outer periphery of said pickling casing containing a circumferential guide rib received in said guide groove.

5. A device according to claim 3, wherein said outer peripheral surface of said drive roller contains radially outwardly extending water retaining means at opposite axial ends thereof.

6. A device according to claim 1, wherein said drive and guide rollers are of identical diameter, said axis of said drive roller disposed lower than said axis of said guide roller.

7. A device according to claim 1, wherein said guide roller is of larger diameter than said drive roller, said axes of said drive and driven rollers disposed at the same height.

8. A rotary pickles making device comprising:
a base body,
a drive roller rotatably mounted in said base body and at least partially exposed therefrom,
a motor for rotating the drive roller,
a guide roller rotatably mounted in said base body and at least partially exposed therefrom, said guide and drive rollers being rotatable about parallel axes, said guide roller spaced from said drive roller in a direction laterally of said axis of said drive roller, an uppermost portion of an outer peripheral surface of said guide roller disposed higher than an uppermost portion of an outer peripheral surface of said driven roller, and
a drum-shaped pickling casing having an outer periphery resting on said drive and guide rollers so as to be rotatable about an axis disposed parallel to said axes of said rollers in response to frictional contact between said pickling casing and said drive roller, whereby a pickling paste and foodstuffs to be pickled are agitated in said pickling casing,
the place of contact between said pickling casing and guide roller being disposed at a higher location than the place of contact between said pickling casing and drive roller such that the loading of said drive roller is greater than the loading of said guide roller to increase the frictional driving forces applied to said pickling casing by said drive roller,
said motor arranged to drive said pickling casing in a direction such that the lower periphery thereof moves from said guide roller toward said drive roller to further increase the loading of said drive roller relative to said guide roller.

9. A device according to claim 8, wherein said base body includes an upwardly open recess within which said drive and guide rollers are exposed, a lower portion of said pickling casing outer periphery disposed in said recess.

10. A device according to claim 8, wherein said drive roller comprises a casing, said motor being contained within said roller casing, and speed-reducing motion transmitting means disposed in said roller casing for transmitting rotary motion from an output of said motor to said roller casing.

11. A device according to claim 8, wherein said outer peripheral surface of at least one of said drive and guide rollers contains a circumferential guide groove, said outer periphery of said pickling casing containing a circumferential guide rib received in said guide groove.

12. A device according to claim 10, wherein said outer peripheral surface of said drive roller contains radially outwardly extending water retaining means at opposite axial ends thereof.

13. A device according to claim 8, wherein said outer peripheral surface of said drive roller contains an anti-slip function-enhancing material.

* * * * *